US012319011B2

(12) United States Patent
Stonyer

(10) Patent No.: US 12,319,011 B2
(45) Date of Patent: Jun. 3, 2025

(54) SANDWICH PANEL AND BUILDING MODULE

(71) Applicant: Reve Architecture Limited, Wellington (NZ)

(72) Inventor: Michael David Stonyer, Wellington (NZ)

(73) Assignee: Reve Architecture Limited, Wellington (NZ)

( * ) Notice: Subject to any disclaimer, the term of this patent is extended or adjusted under 35 U.S.C. 154(b) by 238 days.

(21) Appl. No.: 18/188,922

(22) Filed: Mar. 23, 2023

(65) Prior Publication Data

US 2023/0294369 A1    Sep. 21, 2023

Related U.S. Application Data

(63) Continuation-in-part of application No. 16/948,685, filed on Sep. 29, 2020, now Pat. No. 11,713,573.

(30) Foreign Application Priority Data

Jul. 15, 2020  (NZ) ........................ 766265

(51) Int. Cl.
 *E04C 2/32*     (2006.01)
 *B29C 41/04*    (2006.01)
       (Continued)

(52) U.S. Cl.
 CPC ............ *B29C 69/02* (2013.01); *B29C 41/042* (2013.01); *B29C 41/20* (2013.01); *B29C 44/18* (2013.01); *B32B 5/20* (2013.01); *B32B 15/046* (2013.01); *B32B 27/065* (2013.01); *B32B 27/32* (2013.01); *E04C 2/296* (2013.01); *E04C 2/322* (2013.01); *E04C 2/46* (2013.01); *E04C 2/50* (2013.01);
       (Continued)

(58) Field of Classification Search
 CPC ...... E04B 1/14; E04B 1/3205; E04B 1/34853; E04B 2103/06; E04B 5/02; E04B 7/22; E04B 2001/3258; E04C 2/50; E04C 2/292; E04C 2/322; E04C 2/3405; E04C 2/46; E04C 2002/3444; B29C 41/042; B29C 69/02
 See application file for complete search history.

(56) References Cited

U.S. PATENT DOCUMENTS 3,690,987 A    9/1972  Curran et al.
3,769,766 A    11/1973  Speidel
       (Continued)

FOREIGN PATENT DOCUMENTS

CA    2099809 A1    1/1995
CA    2777635 A1    4/2011
       (Continued)

OTHER PUBLICATIONS

Extended European Search Report in EP21185128.2, mailed Feb. 18, 2022, 9 pages.
       (Continued)

*Primary Examiner* — Jessie T Fonseca
(74) *Attorney, Agent, or Firm* — McKee, Voorhees & Sease, PLC

(57) ABSTRACT

Methods for constructing a building module which is a sandwich panel comprising a first region which provides part of the roof structure of a building, a second region which provides part of the wall structure of building, and a third region which provides part of the floor structure of the building.

19 Claims, 12 Drawing Sheets

(51) Int. Cl.
    *B29C 41/20*     (2006.01)
    *B29C 44/18*     (2006.01)
    *B29C 69/02*     (2006.01)
    *B32B 5/20*     (2006.01)
    *B32B 15/04*     (2006.01)
    *B32B 27/06*     (2006.01)
    *B32B 27/32*     (2006.01)
    *E04B 2/00*     (2006.01)
    *E04B 5/02*     (2006.01)
    *E04C 2/296*     (2006.01)
    *B29K 105/04*     (2006.01)
    *B29K 705/00*     (2006.01)
    *B29L 31/10*     (2006.01)

(52) U.S. Cl.
    CPC ...... *B29K 2023/06* (2013.01); *B29K 2105/04* (2013.01); *B29K 2705/00* (2013.01); *B29L 2031/10* (2013.01); *B32B 2250/40* (2013.01); *B32B 2607/00* (2013.01)

(56) References Cited

U.S. PATENT DOCUMENTS

| | | | |
|---|---|---|---|
| 3,778,528 | A | 12/1973 | Heifetz et al. |
| 3,807,105 | A | 4/1974 | Rudkin, Jr. et al. |
| 4,073,105 | A | 2/1978 | Daugherty |
| 4,937,125 | A | 6/1990 | Sanmartin et al. |
| 9,027,286 | B2 | 5/2015 | Lane |
| 2002/0020129 | A1 | 2/2002 | Winter |
| 2008/0000176 | A1 | 1/2008 | Mandelzys et al. |
| 2013/0067838 | A1 | 3/2013 | Black et al. |
| 2015/0152631 | A1 | 6/2015 | Bree |
| 2020/0130298 | A1 | 4/2020 | Lindeskov et al. |
| 2021/0277648 | A1 | 9/2021 | Dubov et al. |
| 2021/0277653 | A1 | 9/2021 | Pospisil et al. |

FOREIGN PATENT DOCUMENTS

| | | |
|---|---|---|
| CA | 2937630 A1 | 1/2017 |
| CN | 106988340 B | 1/2019 |
| EP | 3088628 A1 | 11/2016 |
| FR | 2316402 A1 | 1/1977 |
| FR | 2509223 A1 | 1/1983 |
| GB | 1298570 A | 12/1972 |
| KR | 20190025293 A1 | 3/2019 |
| NZ | 745100 | 8/2018 |
| WO | 9221516 A1 | 12/1992 |
| WO | 0109454 A1 | 2/2001 |
| WO | 2008133535 A1 | 11/2008 |
| WO | 2010036130 A1 | 4/2010 |
| WO | 2013167774 A1 | 11/2013 |
| WO | 2016174614 A1 | 11/2016 |
| WO | 2019039944 A1 | 2/2019 |
| WO | 2019141678 A1 | 7/2019 |
| WO | 2019239435 A1 | 12/2019 |

OTHER PUBLICATIONS

Insulated Panel, File:L1 Fig7.png, SteelConstruction.info, published by Jun. 13, 2012. Retrieved from the Internet <URL: https://www.steelconstruction.info/File:L1_Fig7.png>, 3 pages.

Office Action in AU2020239680, mailed Apr. 6, 2022, 6 pages.

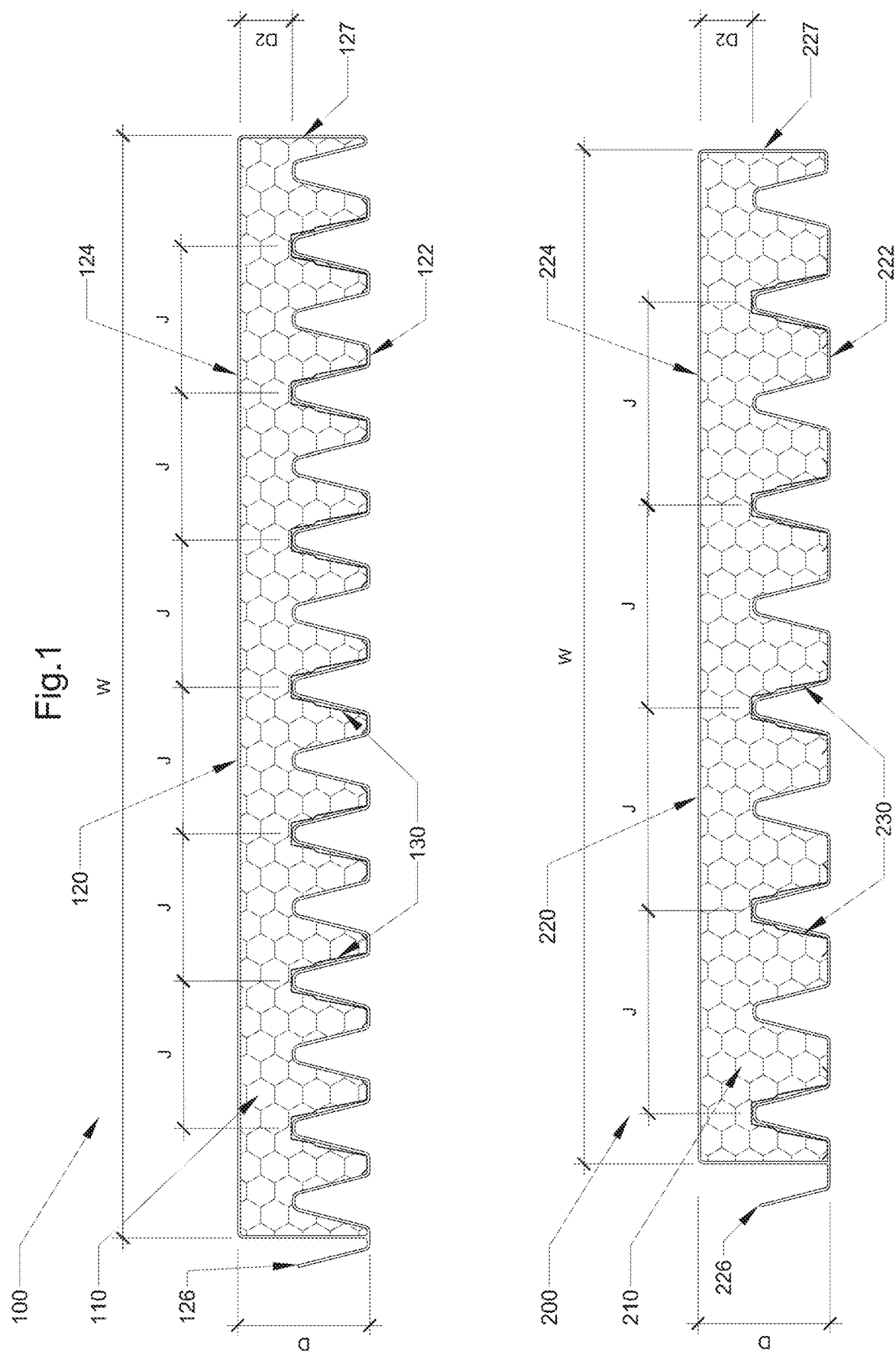

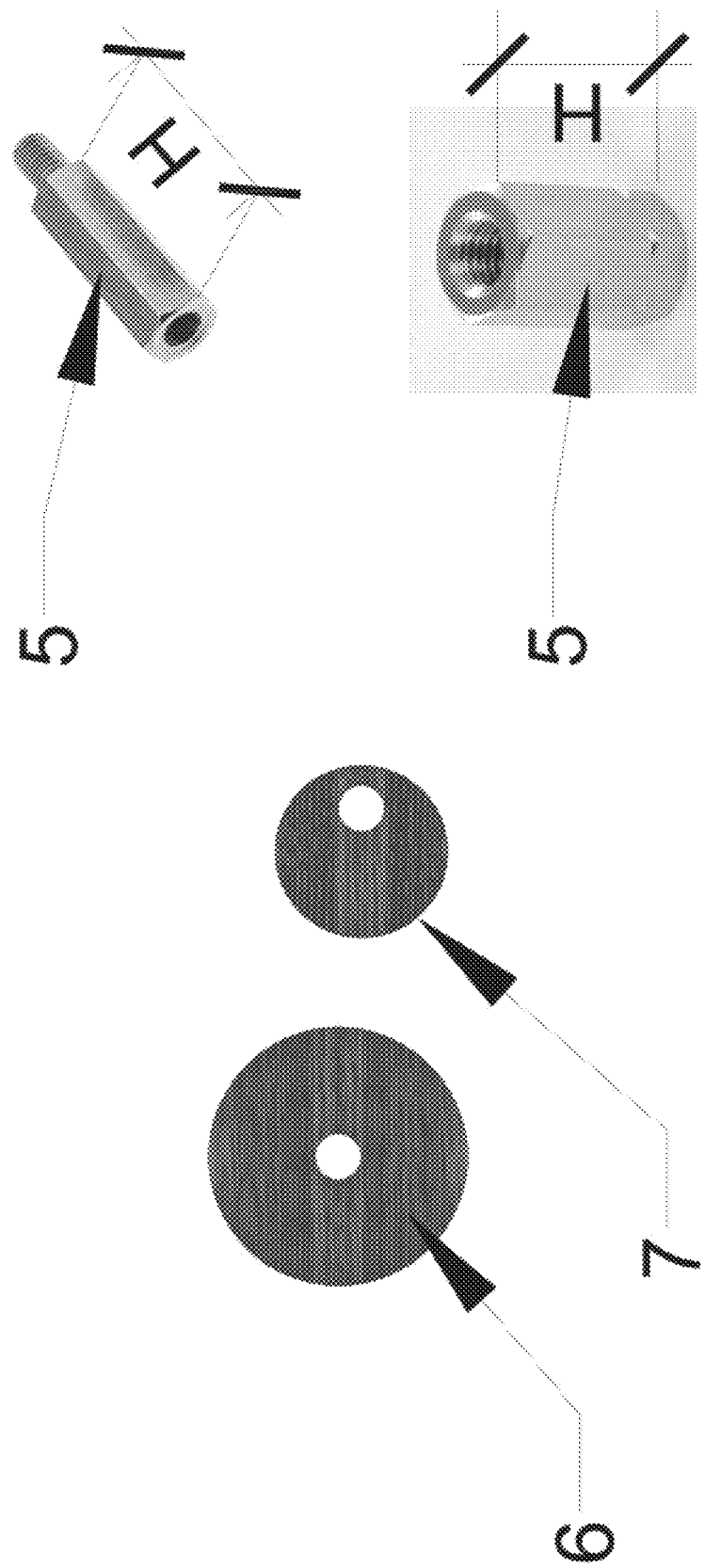

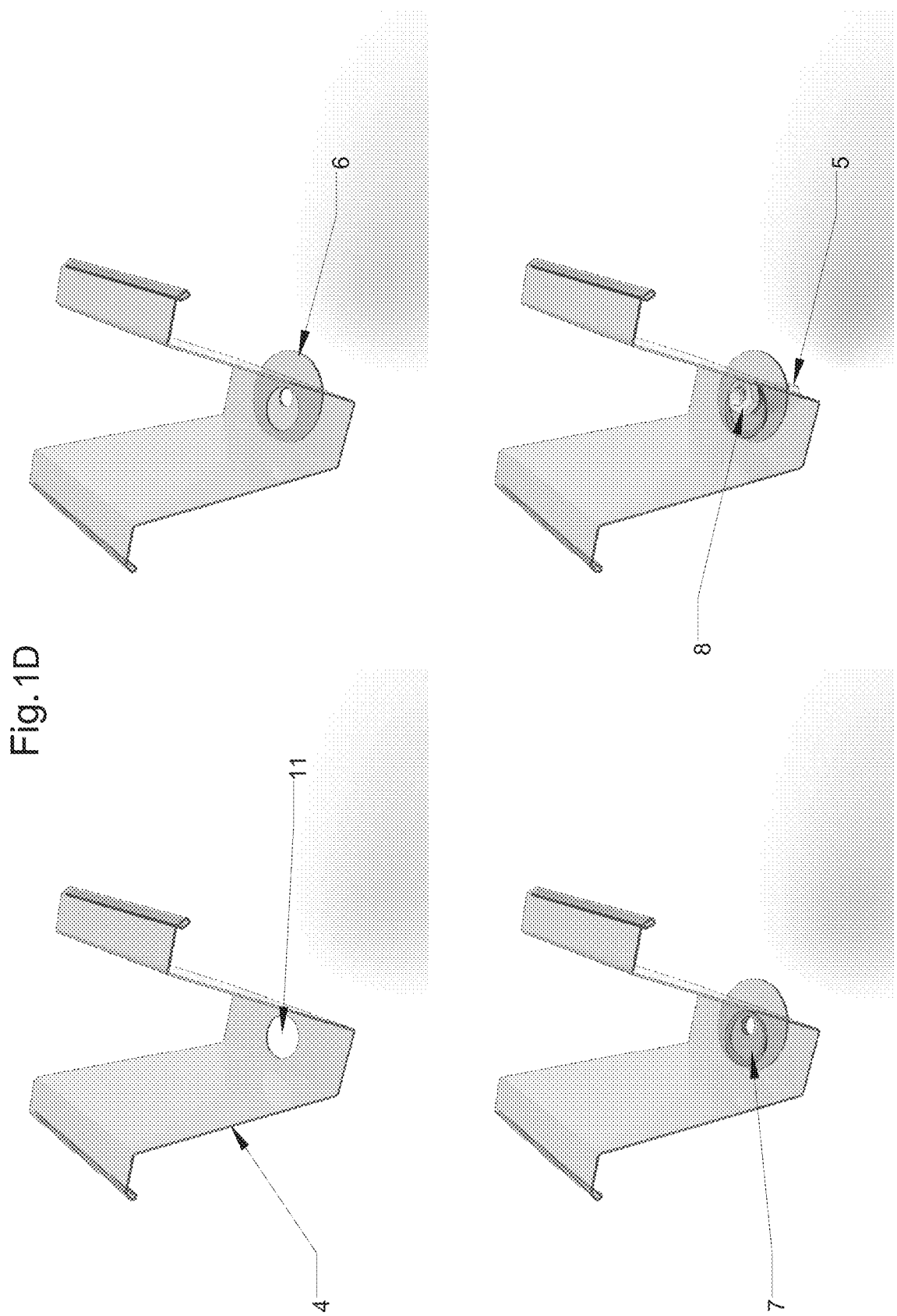

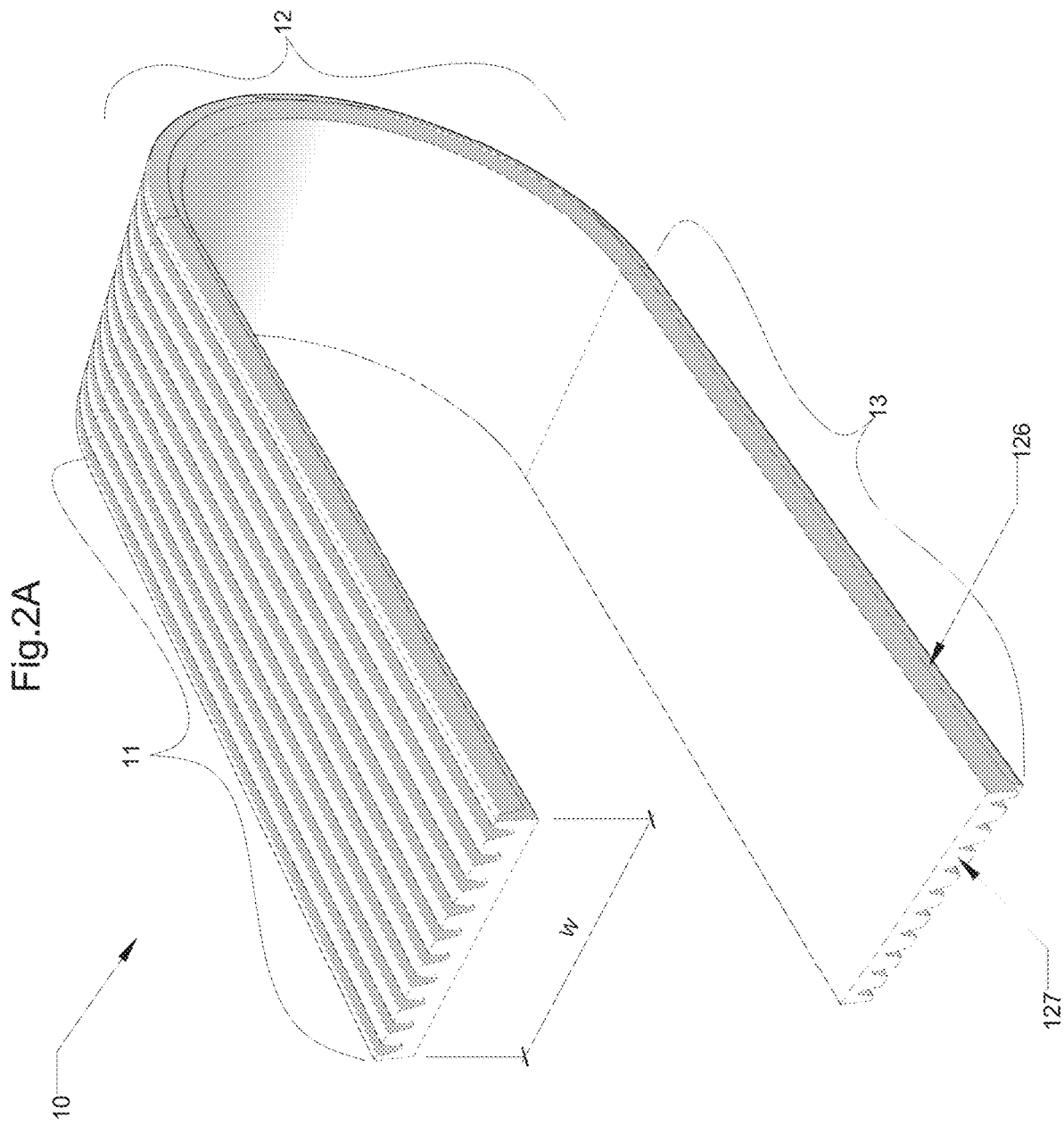

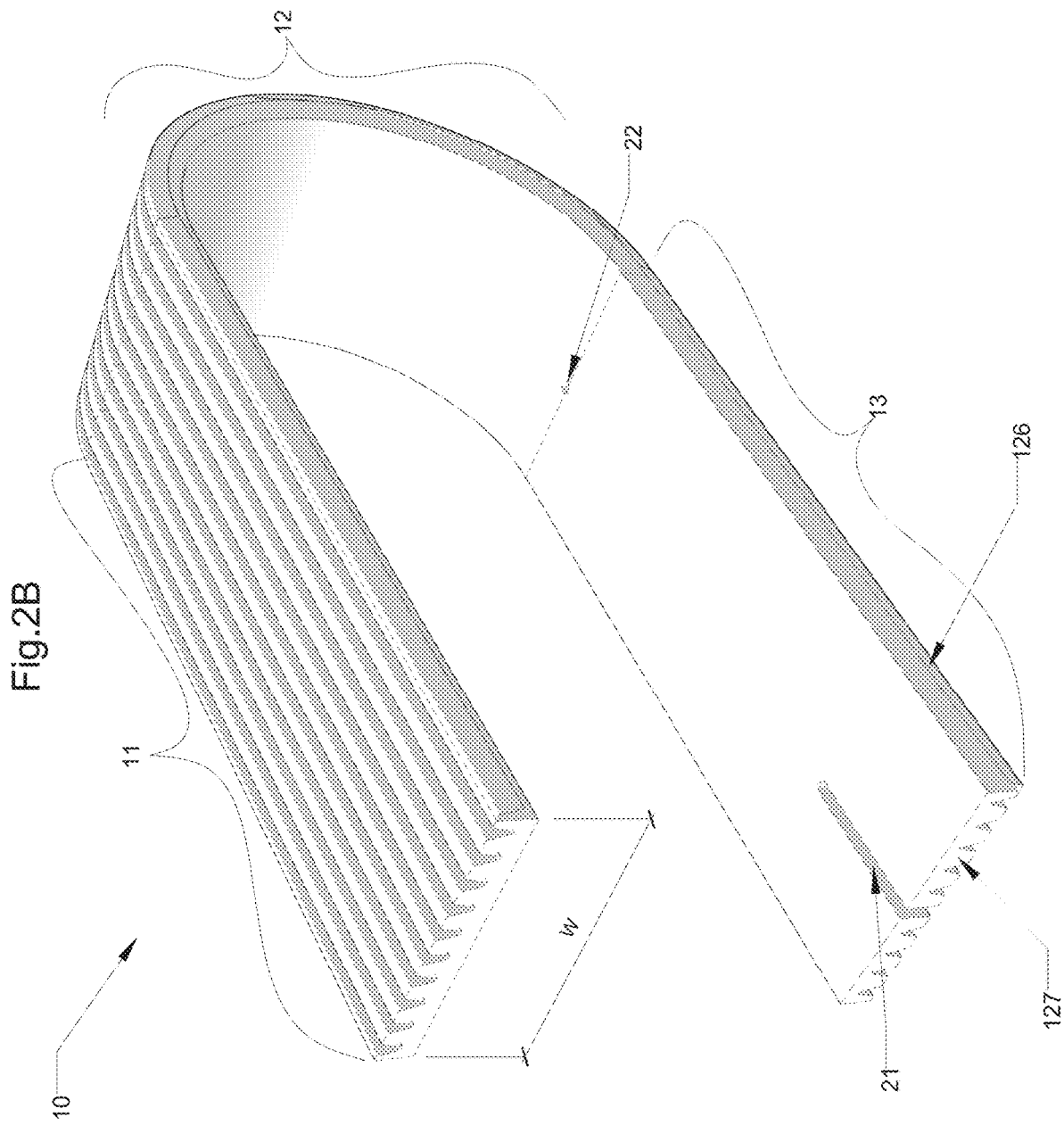

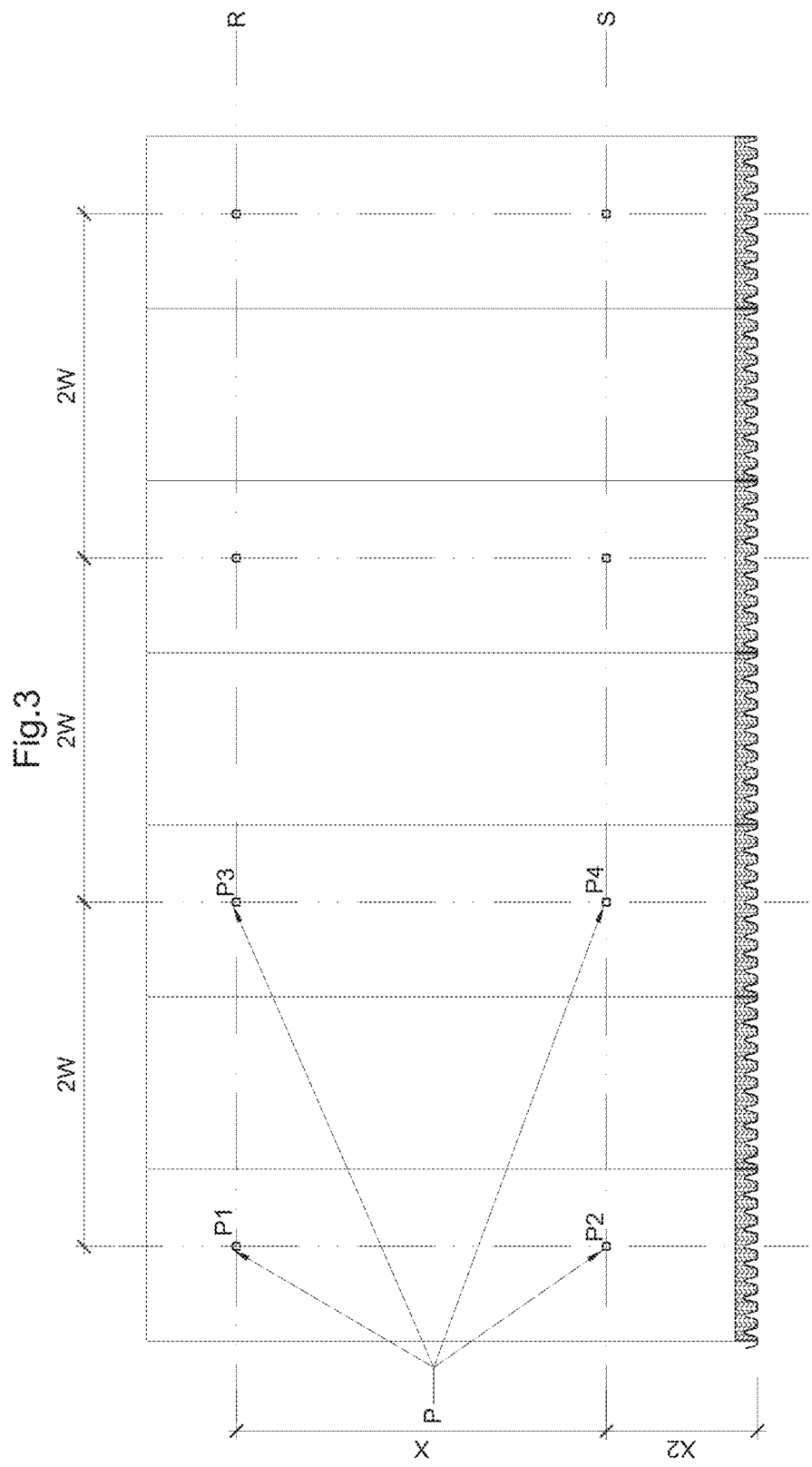

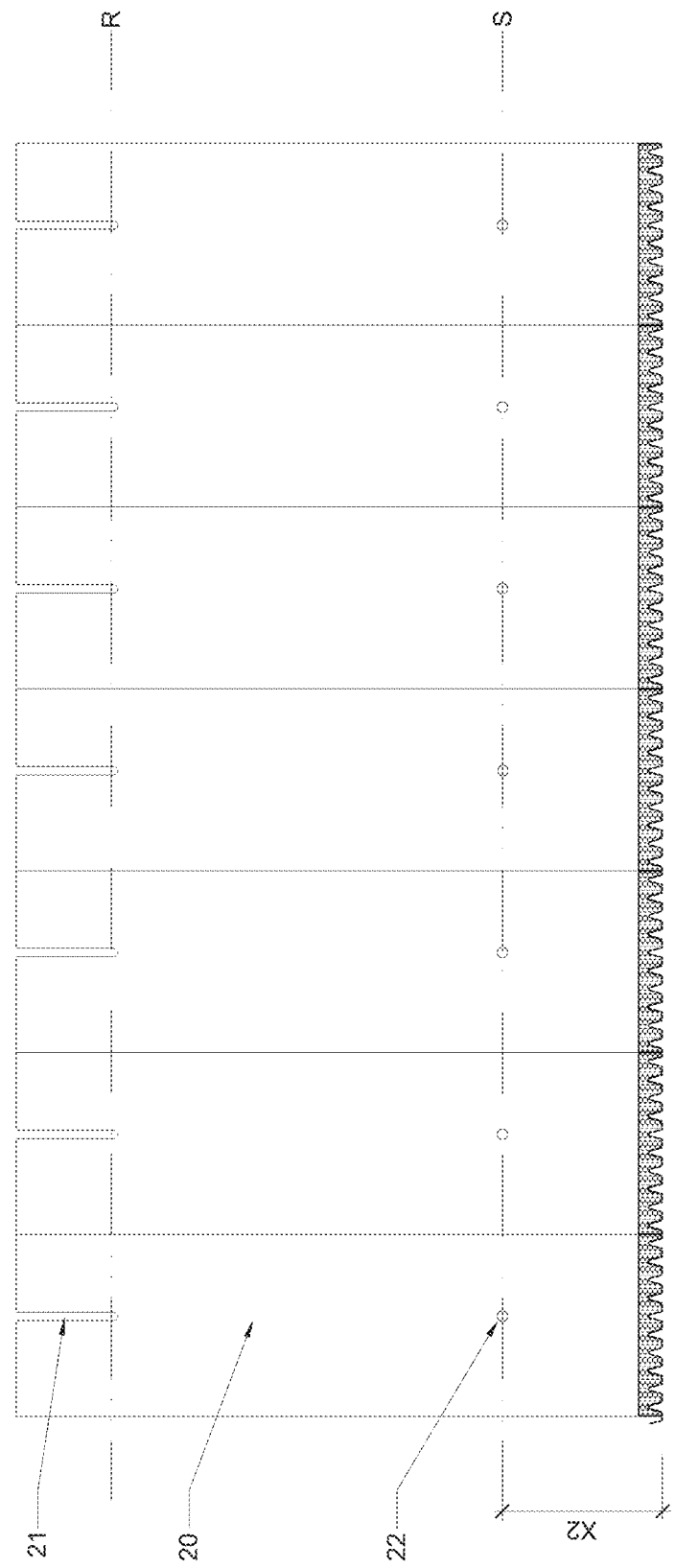

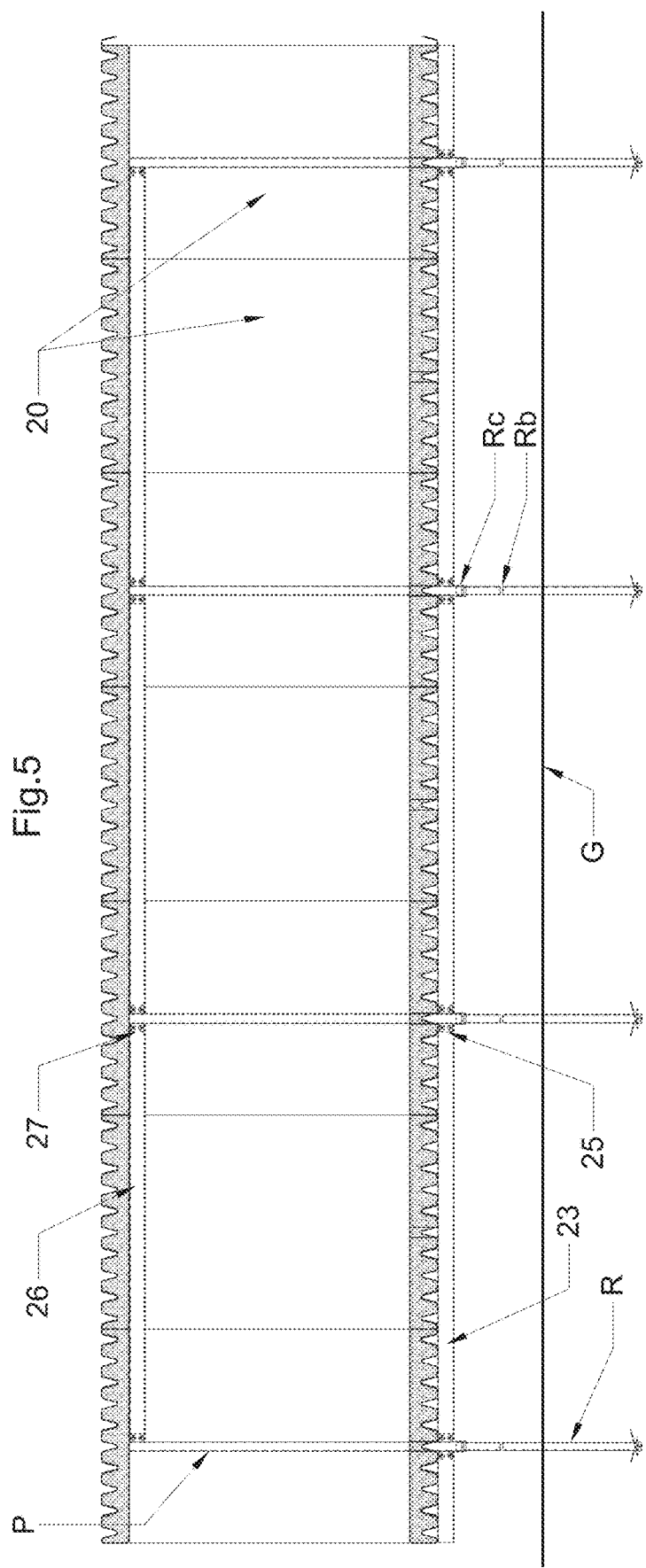

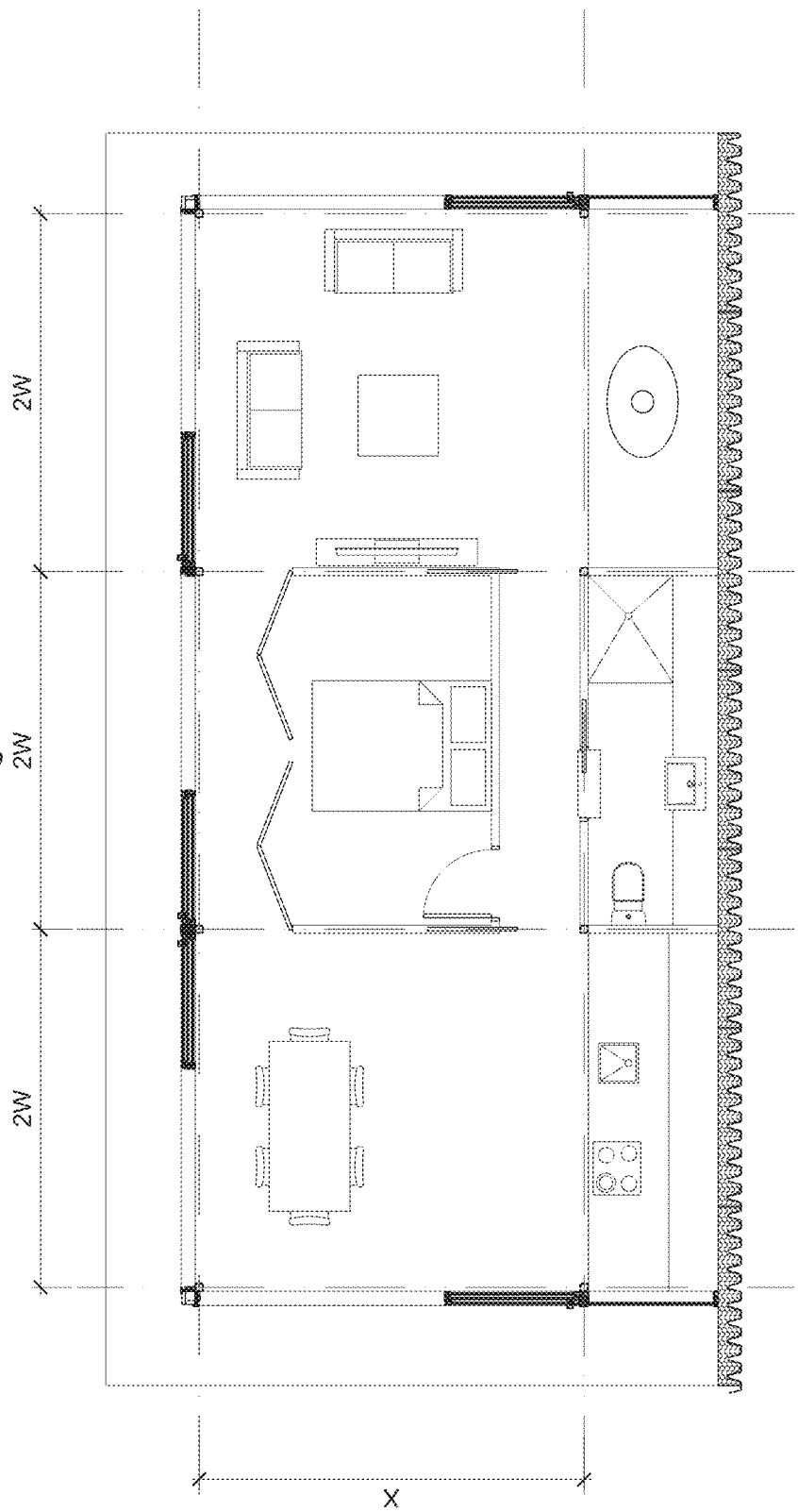

SANDWICH PANEL AND BUILDING MODULE

CROSS-REFERENCE TO RELATED APPLICATIONS

This application is a continuation-in-part application of U.S. application Ser. No. 16/948,685, filed Sep. 29, 2020, which claims the benefit of and priority to New Zealand Provisional Application No. 766265, filed 15 Jul. 2020, the contents of both of which are hereby incorporated herein by reference in their entirety.

FIELD OF INVENTION

This invention relates to a sandwich panel and a building module which can be joined together to construct a building.

BACKGROUND OF THE INVENTION

The construction industry in New Zealand faces a number of unique challenges in providing affordable housing. The field of building prefabrication attempts to address some of these challenges.

Prefabricated dwellings can be constructed in a factory and then transported to a site. This offers the advantage that weather and travel of construction professionals are not factors in the construction process. One downside is that the design of prefabricated dwellings is limited by the mode of transport and route to the construction site, in New Zealand predominantly by truck and possibly by rail. This introduces limitations of width and height of the load to be transported, with the limitation of length being defined by the vehicle. These limitations are usually addressed in one of two ways: by designing the dwelling to fit onto a single truck, known as a "tiny house" or by designing the building as modules to be fitted together on-site.

An advantage of a prefabricated dwelling design is that if the New Zealand Ministry of Building, Innovation and Employment (MBIE) approves the design, they will grant a multi-proof building consent on the design. This means a building consent application corresponding to the multi-proof consent documents must be approved by the Building Consent Authority without questions within 10 days.

Prefabricated dwelling designs made in a factory using conventional components, for example timber framed construction, are offered as factory-made dwellings and also as kit-sets for constructing on-site. Nookhomes.co.nz offer such transportable homes in both formats.

Factory-made dwellings using conventional timber-framed construction use a large number of components and are labour-intensive to assemble, whether on-site or in a factory. Transporting assembled dwellings introduces a number of additional challenges.

A sandwich panel or structural insulated panel (SIP) is a structure comprising three layers; a core of low-density insulating material such as polyurethane (PUR) and an outer skin each side of the core. Sandwich panels can thus provide integrated structural and cladding systems. Their strength and light weight means they can span large distances, making them particularly useful for wall and roof systems in commercial or industrial buildings; their use is less common in domestic buildings. Sandwich panels are usually flat and elongate in form, although curved sandwich panels are also available for installation on curved roofs. In use, a side edge of the elongate form is fixed to the side edge of an adjacent panel. For this reason the side edges of the panels are usually designed with complementary profiles to fix together, often employing screw fixings.

As used herein, the term "sandwich panel" means a structure comprising three layers; a core of low-density insulating material and an outer skin each side of the core.

SUMMARY OF THE INVENTION

In a first broad aspect, the present invention provides a method for constructing a building module which is a sandwich panel comprising: an inner core comprising a foamed material; and an outer core comprising a thermoplastic which completely encloses the inner core; a first region which provides part of the roof structure of a building, a second region which provides part of the wall structure of the building, and a third region which provides part of the floor structure of the building, metal joists within the outer skin of the first region and the third region, the method comprising:
  a. positioning metal joists within a mould for a skin of the sandwich panel, the metal joists supported and held in place by a number of suitable supports such as stand-off plugs or other suitable spacer elements;
  b. forming the skin of the sandwich panel in said mould, by adding a thermoplastic material, and rotating the mould in a rotary oven;
  c. (i) allowing the thermoplastic to set and cure, then demoulding the skin with metal joists within, then forming an aperture in the panel and filling the panel with an insulating material; or
    (ii) allowing the thermoplastic to set and cure, then while the thermoplastic skin in still warm, forming an aperture in the panel and filling the panel with an insulating material, then rotating the mould containing the thermoplastic skin further within the oven at a lower temperature than the melting temperature of the thermoplastic skin, then demoulding the sandwich panel; and optionally wherein the insulating material in step c (ii) is a foam-forming powder comprising polyethylene.

In an embodiment, the metal joists comprise a hole through which a stand-off plug or other spacer element can be secured using washers and a fastener, the hole being larger than the thread of the stand-off plug or fastener and a washer between the fastener and the joist having an eccentric hole.

In an embodiment, the first and third regions are substantially planar and the second region is curved in substantially a semicircle, such that the building module is generally U-shaped.

In an embodiment, the metal joists in the third region are joined to one another by a cross member fixed between the metal joists, optionally metal joists in the first region are joined to one another by a cross member fixed between the metal joists; wherein the cross member is optionally a 100 mm steel tophat joist rivet fixed to the metal joists at 600 mm centres.

In a second broad aspect, the present invention provides a method for constructing a building module which is a sandwich panel comprising: an inner core comprising a foamed material; and an outer core comprising a thermoplastic which completely encloses the inner core; a first region which provides part of the roof structure of a building, a second region which provides part of the wall structure of the building, and a third region which provides part of the floor structure of the building, metal joists within the outer skin of the first region and the third region, the method comprising:
  a. forming a skin of the sandwich panel from a thermoplastic in a rotary oven and allowing the thermoplastic to set and cure;
  b. once the skin is set/cured, demoulding the skin and removing at least one end of the panel;
  c. inserting metal joists into the panel; and
  d. filling the panel with a foamed material and allowing the foamed material to harden; or filling the panel with a substrate inoculated with mycelium, and drying or heating the mycelium after a growth period to form a mycelium composite material;
  e. once the foamed material is hardened or the mycelium composite material formed, cutting the excess foamed material or mycelium composite material flush with the cut panel end(s).

In an embodiment, the first and third regions are substantially planar and the second region is curved in substantially a semicircle, such that the building module is generally U-shaped, and wherein at least one end of the panel is removed to insert steel joists.

In an embodiment, the method is such that in step d) the U-shaped panel is stood vertically and the foamed material is poured in from the top of the U in a controlled manner to fill the entire cavity of sandwich panel without gaps.

In an embodiment, the method is such that after step e) the panel is capped by using a custom heating plate to melt the end of the panel and affixing a thermoplastic end plate, optionally the thermoplastic panel end removed to insert steel joists.

In an embodiment, the foamed material is a polyethylene foam.

In an embodiment, the metal joists in the third region are joined to one another by a cross member fixed between the metal joists, optionally metal joists in the first region are joined to one another by a cross member fixed between the metal joists; wherein the cross member is optionally a 100 mm steel tophat joist rivet fixed to the metal joists at 600 mm centres.

In a third broad aspect, the present invention provides a method for constructing a building module which is a sandwich panel comprising: an inner core comprising a foamed material; and an outer core comprising a thermoplastic which completely encloses the inner core; a first region which provides part of the roof structure of a building, a second region which provides part of the wall structure of the building, and a third region which provides part of the floor structure of the building, metal joists within the outer skin of the first region and the third region, the method comprising:
  a. extruding a skin of the sandwich panel from a thermoplastic in an extrusion die;
  b. optionally, heating the extrusion and bending the extrusion around a form;
  c. allowing the thermoplastic to set/cure;
  d. inserting metal joists into the panel;
  e. filling the panel with a foamed material and allowing the foamed material to harden; or filling the panel with a substrate inoculated with mycelium, and drying or heating the mycelium after a growth period to form a mycelium composite material;
  f. once the foamed material is hardened or the mycelium composite material formed, cutting the excess foamed material or mycelium composite material flush with the cut panel end(s).

In an embodiment, the first and third regions which are substantially planar and the second region is curved in substantially a semicircle, such that the building module is generally U-shaped.

In an embodiment, the method is such that in step e) the U-shaped panel is stood vertically and the foamed material is poured in from the top of the U in a controlled manner to fill the entire cavity of the sandwich panel without gaps.

In an embodiment, the method is such that after step (f) the panel is capped with a thermoplastic end plate using a heat welding process.

In an embodiment, the metal joists in the third region are joined to one another by a cross member fixed between the metal joists, optionally metal joists in the first region are joined to one another by a cross member fixed between the metal joists; wherein the cross member is optionally a 100 mm steel tophat joist rivet fixed to the metal joists at 600 mm centres.

In an embodiment, the foamed material is a polyethylene foam.

In a fourth broad aspect, the present invention provides a method for constructing a building module which is a sandwich panel comprising: an inner core comprising a foamed material; and an outer core comprising a thermoplastic which completely encloses the inner core; a first region which provides part of the roof structure of a building, a second region which provides part of the wall structure of the building, and a third region which provides part of the floor structure of the building, metal joists within the outer skin of the first region and the third region, the method comprising:
  a. forming a skin of the sandwich panel from a thermoplastic in a rotary oven and allowing the thermoplastic to set and cure;
  b. once the skin is set/cured, demoulding the skin and removing at least one end of the panel;
  c. inserting metal joists into the panel, and inserting a foam-forming powder into the panel; wherein the foam-forming powder optionally comprises polyethylene.
  d. returning the panel and the removed end(s) to the mould; closing the mould and rotating the mould in the oven at a lower heat, to thermally bond the removed end(s) back onto the panel, as well as expand the foam-forming powder to a foam inside the thermoplastic skin.

In an embodiment, the first and third regions are substantially planar and the second region is curved in substantially a semicircle, such that the building module is generally U-shaped.

In an embodiment, the metal joists in the third region are joined to one another by a cross member fixed between the metal joists, optionally metal joists in the first region are joined to one another by a cross member fixed between the metal joists; wherein the cross member is optionally a 100 mm steel tophat joist rivet fixed to the metal joists at 600 mm centres.

DESCRIPTION OF THE DRAWINGS

FIG. 1 shows cross section views of two embodiments of the sandwich panels according to two preferred embodiments of the invention.

FIG. 1C shows a selection of washers and stand-off plugs attached to joists and cross members according to a preferred embodiment of the invention.

FIG. 1D shows how washers and stand-off plugs are attached to joists and cross-members according to a preferred embodiment of the invention.

FIG. 2A shows a perspective view of a building module according to a preferred embodiment of the invention.

FIG. 2B shows a perspective view of a building module according to another preferred embodiment of the invention.

FIG. 3 shows a plan view of a building structural system comprising the building module of FIG. 2B.

FIG. 4 shows a plan view of a series of building modules according to an embodiment of the invention.

FIG. 5 shows a front elevation of the building structural system shown in FIG. 3.

FIG. 7 shows an exemplary plan view of a building as shown in FIG. 3.

DETAILED DESCRIPTION

Figure 1A:
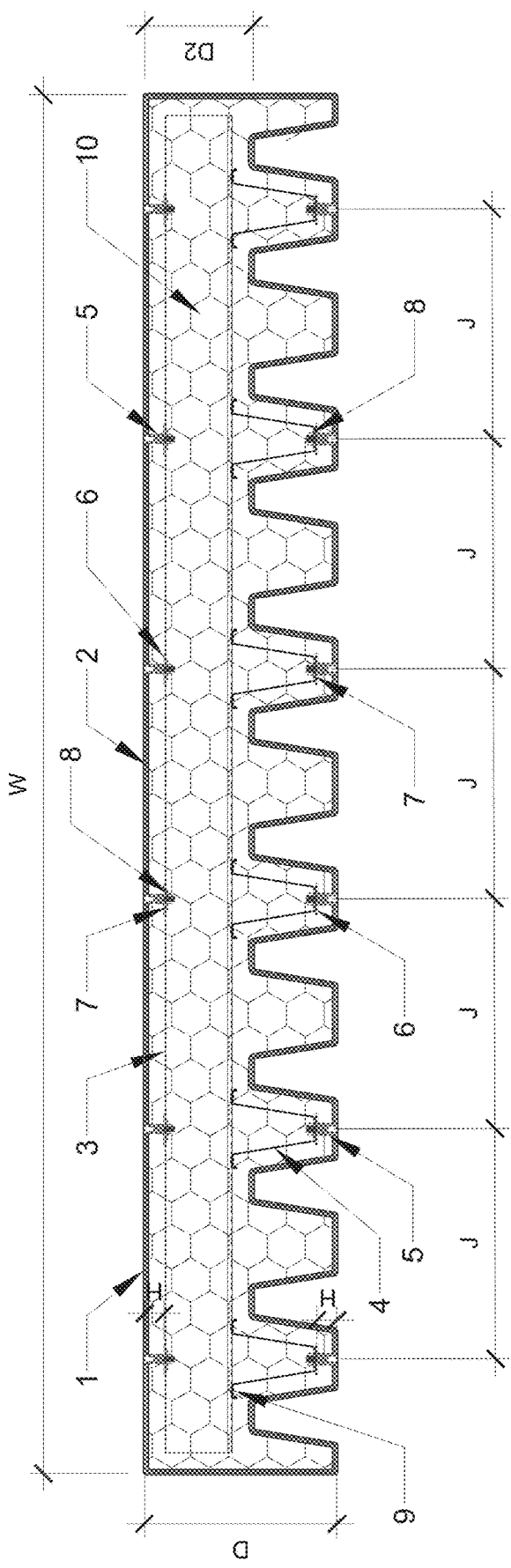
FIG. 1A shows a cross section view of another embodiment of the sandwich panel within the mould used in the rotary oven method for forming the sandwich panel and building module.

Preferred embodiments of the invention will now be described with reference to the drawings.

Sandwich Panel

FIG. 1 shows a cross section view of sandwich panels 100 and 200. Sandwich panels 100, 200 have a width W of 2175 and 2000 mm respectively, although it will be understood by persons skilled in the art that other widths can be chosen. The depth D of sandwich panels 100, 200 is shown in FIG. 1, and in this example is on the order of 260 mm. While the length L of sandwich panels 100, 200 is not shown in the cross section drawings of FIG. 1, it will be understood by persons skilled in the art that sandwich panels usually function as a simply supported beam and sometimes as a cantilever beam, and that known principles of beam design can be applied to determine the required depth D of the sandwich panel with reference to a given length L, and vice versa.

The sandwich panel has a core 110, 210, and a thermoplastic skin 120, 220. The lightweight core comprises an insulating core comprising a foamed material which provides rigidity to the panel. This can be for example a polyurethane foam, including a polyurethane foam formed utilising carbon-capture technology, or a polyethylene foam, or a foam formed from recycled polyethylene terephthalate (PET). In other embodiments the lightweight core can comprise a material such as a mycelium composite. Mycelium composites are formed by growing mycelium spores on a substrate such as wood chips, agricultural by-products, wool or fleece.

A preferred material for the thermoplastic skin is polyethylene, for example high-density polyethylene (HDPE) or linear low-density polyethylene (LLDPE). Thermoplastics have a number of advantages, including that they can easily be moulded into simple or complex shapes, and can be heat welded together. The thickness of the thermoplastic skin 120, 220 in this example is about 5 mm. The thermoplastic skin can be formed in a number of ways, including but not limited rotational moulding, extrusion, and vacuum forming, as is known to persons skilled in the art. Advantageously, flame-retardant additives can be added to the thermoplastic skin, as known in the art.

In sandwich panels known in the art, the side edges of the panels are usually designed with complementary profiles to fix together, often employing screw fixings. The sandwich panel of the invention comprises a lip 126/226 which fits over a crest 127/227 of an adjacent sandwich panel.

Sandwich panels 100, 200 comprise steel joists 130, 230. In these examples, steel joists 130, 230 have a profile known as MS Tophat, generally an inverted V-shape with a flat top and protruding flanges on the bottom which can receive fixings (FIG. 1). In the embodiment shown in FIG. 1, steel joists 130 have a depth of 150 mm. Suitable steel joists are available from commercial suppliers including Metalcraft Roofing and Steel and Tube Holdings Ltd. An advantage of using a commercial steel joist is that span tables are already available.

One side of the thermoplastic skin 120, 220 has a ribbed profile 122, 222 to accommodate steel joists 130, 230. The other side of the thermoplastic skin has a flat profile 124, 224. Steel joists in sandwich panels 100, 200 have a spacing J of 290 mm centres and 400 mm centres respectively, although the person skilled in the art will appreciate that other spacings are possible. In a preferred embodiment, the steel joists have a cross member rivet-fixed above the joists at 600 mm centres (not shown in FIG. 1). This ensures that the steel joists sit hard into the troughs in the positions shown in FIG. 1. The cross member can be for example a 100 mm steel tophat joist.

Ribbed profile 122, 222 can be described as a deep ribbed profile, where the depth of the ribs is at least half of the depth D of the panel (i.e. D2≤0.5 D). In the embodiments shown, D2 is 103 mm and D is 260 mm.

While inserts 130, 230 are formed from steel, it is contemplated that aluminium joists could also be used. The high strength-to-weight ratio of steel and aluminium makes these materials particularly suitable to form the joists. The person skilled in the art will understand that the joists need not have MS Tophat profiles, but can be any shape which allows them to function as a beam, including for example open web steel joists and rectangular hollow sections. Similarly, there is no need to provide a ribbed profile in the thermoplastic skin in order to accommodate the steel joists. The ribbed profile matching the profile of the joists 130, 230 provides advantages in forming the sandwich panel or building module of the invention, as described below.

Once formed, the sandwich panel of the invention is encapsulated by the thermoplastic skin, which provides weather-tightness and durability to the panel. In conjunction with the foamed material, the metal/steel joists provide the thermoplastic-skin panel with greater rigidity, enabling the panel to span greater lengths between supports.

Figure 1B:
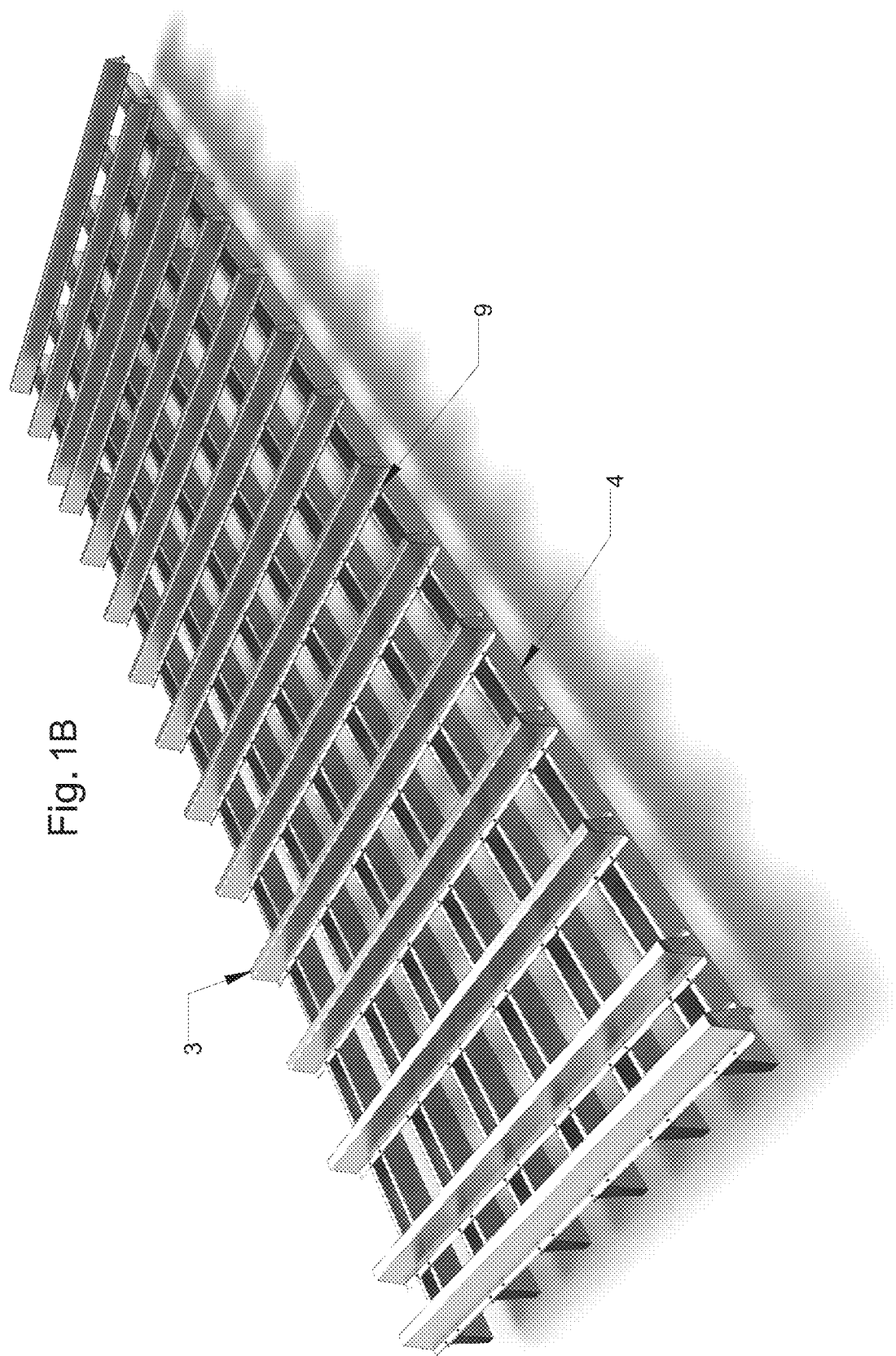
FIG. 1B shows a network of joists and cross members according to a preferred embodiment of the invention.

FIG. 1A shows a cross-section view of a third embodiment of the sandwich panel, within a rotary mould 1. The rotary mould may be steel or aluminium. The sandwich panel comprises a network of joists 4 and cross members 3 encapsulated in the foamed material 10 and thermoplastic skin 2. Both the joists and cross members have an MS Tophat profile and are rivet-fixed to one another by their protruding flanges, such that flat top of the V-shape faces outward. This network is depicted in FIG. 1B. Joists have regular spacing J, which can be adjusted as needed. In a preferred embodiment, spacing J is 330 mm. Cross members are rivet-fixed 9 above the joists at 600 mm centres.

In a preferred embodiment, the network of joists and cross members is held in place within the sandwich panel by stand-off plugs 5. Examples of stand-off plugs 5 can be found in FIG. 1C. Each stand-off plug has a stand-off H, chosen such that once the joists and stand-off plugs are placed inside the rotary mould, the plugs abut the interior walls of the mould. Stand-off plugs have at least one female thread, the female thread facing outwards in the mould such that further connections can be made once the sandwich panel is complete. In addition to holding the network of joists in place, the stand-off plugs can be attached to and sit directly on posts and bearer beams once the building is assembled to form the structure of the building. All forces are dispersed through the metal structure. The foam and thermoplastic skin serve only to encapsulate and isolate the metal structure from the environment. The buildings/building modules are thus more durable, and easier to maintain: damaged foam/thermoplastic sections can be cut out and replaced without worries that the integrity of the building may be compromised.

FIG. 1D shows how steel washers, stand-off plugs, and nuts in FIG. 1C are used to keep the network of joists and cross-members in place within the mould and the sandwich panel. Each joist or cross-member has a hole 11 for a stand-off plug to pass through. The temperature within the rotary oven must be high enough to melt the thermoplastic and allow it to coat the interior of the mould. The heat causes expansion in the steel and the thermoplastic. As such, when the sandwich panel is removed from the oven and cooled, both the steel and the thermoplastic will shrink. However, they will shrink at different rates and to different degrees. Joists cannot move in relation to one another, but the stand-off plugs are anchored in the thermoplastic and will move as the plastic shrinks in relation to the joists. Hole 11 is oversized to accommodate the lateral movement of the stand-off plugs in relation to the network of joists and cross-members. The size of the hole can be as big as is allowed by the dimensions of the joist and without comprising the strength of the joist. In a preferred embodiment, the inside width of the joists at the top of the V-shape is 30 mm. To allow the washer to sit flat within it, the diameter of the hole is 24 mm. A person skilled in the art will recognise that it is possible for the diameter to be larger or smaller, so long as the dimensions and strength of the joists and the degree to which the thermoplastic will shrink are accounted for. To ensure that the joists are held in place despite the movement of the stand-off plugs, each joist is threaded onto the stand-off plug between a washer with a concentric hole 6 and a washer with an eccentric hole 7. The holes of both washers are the same diameter as the thread on the stand-off plugs. The eccentric hole is centred exactly halfway between the centre of the washer and the edge of the washer. The concentric washer has a diameter 1.5 times larger than the diameter of the eccentric washer. As shown in the images, the concentric washer 6 provides a wide base, ensuring that the stand-off plug cannot slip through hole 11. The eccentric washer 7 is placed within the V of the joist, and can spin to follow the movement of the stand-off, while covering enough of hole 11 to ensure that the connection is secure once nut 8 is tightened. If a stand-off plug with two female thread is used, a bolt is used in place of nut 8, but the arrangement of the washers remains the same Building Module With reference to FIG. 2A, a Building module 10 which is a sandwich panel is shown. Building module 10 comprises a first region 11 which provides part of the roof structure of a building, a second region 12 which provides part of the wall structure of the building, and a third region 13 which provides part of the floor structure of the building.

It is generally expected that the floor region of the building module will be flat for functional reasons. While the preferred embodiment advantageously has a roof region pitched at 3 degrees to allow for rain runoff and a curved wall region, as discussed further herein, other arrangements are contemplated.

Regions 11 and 13 possess the structure of a sandwich panel 200, comprising steel joists and an insulating core comprising a foamed material as shown in FIG. 1, ribbed profile for the outer skin, flat profile for the inner skin, and lip 226 (FIG. 2) which fits over crest 227 of an adjacent building module. Region 12 comprises a thermoplastic skin having a cross section corresponding with regions 11/13, but filled with foamed material only. Curved wall region 12 is non-loadbearing and therefore does not have steel joists.

FIG. 2B shows another building module 20, generally corresponding to building module 10 and comprising first region 11, a second region 12, and third region 13. Building module 20 further comprises slot 21 in region 13, and hole 22 at the junction of regions 12 and 13. The purpose of slot 21 and hole 22 is described below with reference to a preferred way of constructing a building. The steel joists inside each module 20 run parallel with, and flank the slot and hole in each panel. Where interrupted by slot 21, the cross members inside each module will not cross the entire panel.

In the embodiments shown, building modules have a width W of 2000 mm, although it will be appreciated that other widths can be used.

A number of building modules can be fitted together to provide the floor, wall and roof structure, cladding and insulation of a building of desired length L, being a multiple of the building module width W. A method for constructing a building from building modules 20 is described in detail below.

Method for Forming Sandwich Panel and Building Module

The thermoplastic skin of sandwich panel 100, 200 or building module 10 or 20 can be formed by rotational moulding. This involves forming a skin of the sandwich panel from a thermoplastic in a rotary oven. This results in a completely enclosed hollow skin 120, 220.

Rotational moulding ovens are available to fabricate larger items such as storage containers, water tanks and playground equipment. The building module of the invention can be formed in a single piece in a large rotary oven. It may also be formed in two or more parts, for ease of shipping. In the preferred embodiment, the length of building module 10 is on the order of 7 metres, and height on the order of 3 metres. A suitable oven is available at, for example, New Zealand company Galloway International.

Once the skin is set/cured, it can be demoulded. To insert the steel joists into the sandwich panel, one end of the panel is sliced off, the joists can then be slid into place. In the case of a sandwich panel which is a building module 10, the ends of roof region 11 and floor region 13 of the building module are sliced off, the joists can then be slid into place in regions 11 and 13. As mentioned above, in the preferred embodiment, the steel joists are fixed to one another using a cross member, which can be for example a 100 mm steel tophat joist cross member rivet fixed above the joists at a regular spacing, e.g. at 600 mm centres, ensuring that the steel joists sit hard into the troughs.

Once the steel joists are inserted, the panel is filled with a foamed material, in the preferred embodiment a polyurethane foam, ensuring that the entire cavity of the sandwich panel is filled. For the U-shaped building module of the invention, this may be achieved by orienting the panel with regions 11 and 13 pointing upwards and then pouring or injecting the foamed material. Once the foamed material has hardened, the excess material is cut flush with the cut panel end. The end of the panel can then be sealed by heat welding, either using the previously removed end of the panel, or using a custom-made capping, that is then heat-sealed using a custom heating plate to melt the cut end and reseal.

In embodiments where a mycelium composite is used, instead of pouring or injecting foamed material into the panel, a substrate can be inoculated with mycelium spores and then inserted within the thermoplastic skin. After a growth period, the mycelium can be dried or heated to form a mycelium composite material. Another way to form the thermoplastic skin is by extrusion. Either the entire skin 120, 220 can be extruded through a die to provide the desired profile of the skin, or separate parts of the skin can be formed by extrusion, for example ribbed side 222 and flat side 224, which can then be welded together. The joists can then be inserted and the ends sealed as in the rotational moulding process. To form building module 10 or 20, the extrusion must be bent or wrapped around a form while in a plastic state.

It will be appreciated by the person skilled in the art that the sandwich panel 100, 200 can be used to form a roof, floor or wall. While the ribbed profile forms the exterior of building module 10 or 20, a planar sandwich panel having the cross section shown in FIG. 1 can be used with the ribbed profile facing either the interior or the exterior of a building.

Where the building module is formed in two or more parts, the mould can be adapted such that each part comprises features that cooperate to facilitate joining. For example, one part may have a protrusion and the other a recess at the joining point, such that a lapped join is formed when they are assembled. A person skilled in the art will recognise that there are a number of ways to join two parts of the building module, and the moulds can be adapted as needed. The parts can then be shipped to the building site and assembled to form building module 10 or 20.

Alternative Method for Forming Sandwich Panel and Building Module

The rotational moulding process can be used to form the sandwich panel and building module with the steel joists already positioned within the thermoplastic skin. This is exemplified in FIG. 1A. Cross members 3 are riveted across steel joists 4 and positioned within a mould 1 for a skin of the sandwich panel, supported and held in place by a number of suitable supports, such as stand-off plugs 5 or other suitable spacer elements. The skin of the sandwich panel can then be formed in said mould, by adding a thermoplastic material, rotating the mould in a rotary oven and allowing the thermoplastic to set/cure. Once the skin is set/cured, the thermoplastic skin 2 with steel joists within can be demoulded. The sandwich panel can then be filled with an insulating material 10 by forming an aperture in the panel.

In some embodiments, an insulating foam is formed from a powder which is inserted into the thermoplastic skin while the thermoplastic skin is still warm, i.e. just after it has been formed in the rotary oven. The powder can be inserted by forming aperture(s) in the thermoplastic skin 2, for example by drilling. After the powder is inserted, the aperture is then plugged. The mould containing the thermoplastic skin is then rotated further within the oven at a lower temperature than the melting temperature of the thermoplastic skin. The powder expands to a foam within the mould and adheres to the thermoplastic skin. Once cooled, the sandwich panel is removed from the mould as a single integrated piece with no seams. In a particularly preferred embodiment, the thermoplastic skin is formed from HDPE and the powder is a polyethylene powder.

This method offers the advantage that there is no need to remove the ends of the mould to insert the steel joists and reseal the ends back onto the mould afterwards. Additionally, adhesion between the respective polymers is enhanced in embodiments using HDPE skin and a polyethylene powder. The sandwich panel/building module so formed is seamless and has a neat finish and simple process of production. Due to the rotational moulding process, this method would result in some thermoplastic material adhering to the steel joists inside the mould, and it is expected this would result in use of more thermoplastic material per sandwich panel/building module.

A sandwich panel may only require a few stand-off plugs/coupling nuts to hold the joists in place. However, more coupling nuts may be required to attach the joists to posts, beams, or other structures of the building. Thus, in some embodiments, after the sandwich panel is formed, a hole can be drilled through the thermoplastic and foam, into the joists. Coupling nuts can then be attached to the joists. This may be done with a blind bolt type fixing, like a Thinwall bolt.

Method for Constructing a Building Using the Building Module

The person skilled in the art will appreciate that the building modules of the invention can be coupled to one another and fixed to the ground in a number of ways to construct a building. One preferred method is described as follows.

In the preferred embodiment, a screw pile system is used. Screw piles formed from steel are available from, for example, Katana Foundations (NZ). Screw piles have advantages in that they are easy to position and quick to install. They also require no concrete placing and are suitable for deep to soft soil conditions found throughout New Zealand. They can be removed, allowing for the proposed building to be relocated or recycled at end of life. In the method of the example, screw piles are installed in the ground in a grid arrangement, and will each support a steel post P. Screw pile extensions can be coupled to the top of a screw pile above ground. As used herein, the term "screw pile" refers to a screw pile either with or without a screw pile extension.

The method of the example uses building modules 20, which slide onto each other as described further below. Slots 21 and holes 22 are useful in the construction method, but once the building structural system has been erected, all slots 21, and all unused holes 22, are filled in with moulded inserts of the appropriate shape to fit slot 21 and hole 22.

FIGS. 3 and 4 show the grid arrangement of steel posts P at positions P1, P2 etc. Slots 21 and holes 22 (not shown in FIG. 3; shown in FIG. 4) accommodate the steel posts P. Posts P are arranged in two parallel rows R and S (FIG. 4). Posts in rows R and S are at a spacing of 2W, and row R is at a distance X from row S (FIG. 3). In the embodiment shown, X is 4300 mm.

While FIGS. 3 and 4 show a plan view of a building formed from seven building modules 20, it will be appreciated that any number of building modules 20 can be used to form a building in this way.

As shown in FIG. 4, each building module 20 comprises a slot 21 extending from the end of region 13 to the desired position of row R, and a hole 22 at the desired position of row S. The distance X2 between hole 22 and the periphery of building module 20 should be sufficient to locate hole 22 in floor region 13 rather than curved wall region 12. In the example shown, distance X2 is about 1650 mm and corresponds generally to the radius of curved wall region 12.

FIG. 5 shows a schematic front elevation of the structural system for a building according to the invention. In this Figure, a nominal position G is shown for the ground line, and break lines Rb indicate that the proportion of screw piles R above the ground is indeterminate. Adjacent screw piles can be coupled above-ground by cross-bracing as required.

Generally, the top of the shaft of each screw pile can be provided welded to a square drive head. This provides for easy installation of the screw pile and also allows the shaft of the screw pile to be coupled to a post or a pile extension above, by means of a collar, shown as Rc in FIG. 5. The collar advantageously comprises a plate or square nut welded to its inner walls to seat the collar on the square drive head. As is known in the art, the collar can also comprise holes for fixings such as M12 bolts to pierce the pile shaft and/or post.

To construct the building, two rows R and S of screw piles are installed in any order, at a spacing related to the width W of the building modules. In the embodiment shown, the spacing 2W is twice the width W of the building module, and only every second building module will be fixed to a screw pile (FIG. 5). The spacing can also be e.g. equal to the width W of the building module, in which case every building module will be fixed to a screw pile, or another arrangement as will be understood by the person skilled in the art.

The distance between the two rows R, S corresponds to the distance between hole 22 and the end of slot 21 on the building module 20.

Once each row R and S is installed, posts P can be fixed to screw piles in row R, and bearer beams 23 can be fixed to row R and S respectively, at a height to support floor region 11 of the building modules. These steps can be done in any order, provided that no posts P are yet fixed to row S. A bearer beam must be fixed to the screw piles of row S, but it is possible for a bearer beam 23 to be fixed either to the screw piles of row R (i.e. below collar Rc), or to posts P in row R (i.e. above collar Rc, shown in FIG. 5).

Bearer beams 23 can be fixed at row R and S respectively using methods known in the art. The bearer beams can be of any suitable material and profile; a preferred material is hot dipped galvanized steel, preferably of a parallel flange channel (PFC) profile, which will be resistant to corrosion and those at row R can for example be fixed to the posts P using a cleat plate and bolts 25 (shown in FIG. 5).

In this example, each post P is a 89 SHS and is coupled via a collar formed from a 100 SHS to a screw pile having a circular hollow section (CHS) and a square drive head of comparable width to post P. However, posts P can be any desired shape, including for example CHS posts.

Once posts P are installed along row R, a beam 26 is fixed to the top of posts P along row R, using methods known in the art, to support roof region 11 (FIG. 5). In this example the fixing means is via cleat plates and bolts 27. A corresponding frame is to be constructed along row S, but is not et constructed. Thus, in this example, the entire frame along row R is installed (both the top beam 26 and a bearer beam 23), and a bearer beam 23 is installed to row S, before the modules are fixed to the frame.

Next, slot 21 of a first building module 20 is slid onto a first post P1 in row R, such that hole 22 aligns with screw pile P2 on in row S (FIG. 3). Slot 21 of the first building module can then be plugged with a HDPE moulded insert. Post P2 in row S can then be installed through hole 22 to screw pile P2, either at this stage or after all of the building modules 20 are in place.

The moulded inserts can be provided in the appropriate shape to fit slot 21 and hole 22, and can also be formed by a rotational moulding process. In this example the moulded inserts are also filled with PUR foam for rigidity. They can be heat welded into place once the module is installed on the frame.

A lip of a second module is then aligned with a complementary crest of the first module, and the second building module is then slid onto the first building module. In the embodiment shown, second building module 20 is not installed to a screw pile; it is held to the first module by a friction fit. This means that slot 21 and hole 22 of the second building module 20 will not perform a function, and can be plugged with a HDPE moulded insert. Alternatively, every second building module could be provided without slot 21 and hole 22. Providing every building module with slot 21 and hole 22 has advantages that only one mould is needed to form the building modules, and provides flexibility during installation.

It will be appreciated that in alternative embodiments, every building module will have a complementary pair of screw piles, and every slot 21 and hole 22 will receive a post P.

In this example, the slot 21 is about 1 m in length. Thus, once installed, the floor region of each module will cantilever 1 m beyond gridline R (FIG. 4). Optionally, instead of cantilevering the floor regions in this way, an additional steel beam could be placed within each slot 21 to bear on a steel end beam underneath the end of region 13 (not shown). Advantageously, a balustrade could be fixed to such an additional steel end beam.

As stated above, once each building module is installed on the frame along row R, posts P2, P4 etc. can then be installed to screw pile P2, P4 etc. via holes 22. When all posts in row S are in place, a second beam (not shown) can then be fixed to the top of the second row of posts P2, P4 etc. using methods known in the art, to provide a second frame along row S and support the roof region 11.

Dimensions of the posts P and beams can be calculated by methods known in the art, with reference to the required span for beams and the material used, and the load to be borne by beams/posts. The building modules of the invention are strong and lightweight. For an unloaded building module 20, a post of 89 mm width is expected to be sufficient. This does not take account of snow loads; it is also envisaged that the invention will allow for buildings having green roofs, which increase the load on the structural frame. Calculation of the required increase to the dimensions of posts P and roof beams in such situations can be made using known methods. The width of hole 22 and slot 21 are governed by the width of posts P; for example, hole 22 has a diameter of 120 mm to accommodate a steel post of 89 mm width.

Roof region 11 and floor region 13 can be fixed to the respective beams by fixing screws into the steel joists within the panels.

While FIGS. 3 and 4 and the associated text describe a preferred method for fixing the building modules to the ground, it will be appreciated that the general approach of providing holes in the floor region of the building module can be adapted to accommodate any foundation system.

Finished Building

Figure 6:
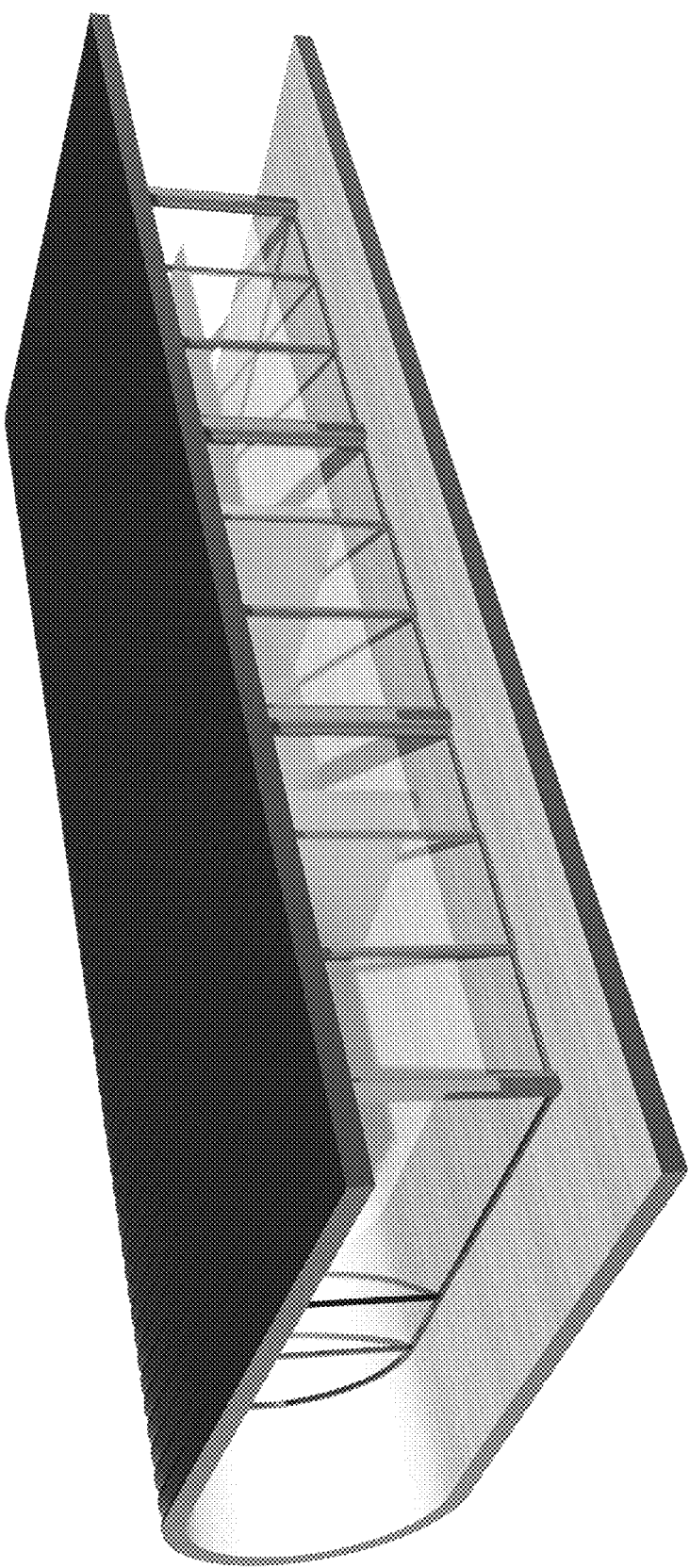
FIG. 6 shows a perspective view of a building constructed from the building module of FIG. 2A or 2B.

After forming the shell of a building by the method described above, the open sides of the building shell may be provided with aluminium journey, for example double glazed sliding doors and windows, or with another partition wall system. A perspective view of such a building is shown in FIG. 6. Joinery can be fixed to the regions 11, 13 using bolting and/or heat welding techniques. Partition walls can be constructed to the interior of the building using similar bolting and/or heat welding techniques. An exemplary single-bedroom floor plan showing partition walls is shown in FIG. 7; it will be appreciated by the person skilled in the art that many variations are possible.

The surface of the thermoplastic, HDPE in the embodiment shown, is durable and does not need painting or other finishing, and as discussed above, can accept a green roof system if desired. The inner surface of the thermoplastic provides a floor surface and exterior deck. This can provide the finished floor surface, or alternatively a finished floor surface can be provided on top of the thermoplastic using another floor system.

It is to be understood that, if any prior art publication is referred to herein, such reference does not constitute an admission that the publication forms a part of the common general knowledge in the art, in the United States or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated feature but not to preclude the presence or addition of further features in various embodiments of the invention.

The invention claimed is:

1. A method for constructing a building module which is a sandwich panel, the method comprising:
   a. positioning metal joists within a mould for a skin of the sandwich panel, the metal joists supported and held in place by a number of supports or spacer elements;
   b. forming the skin of the sandwich panel in said mould, by adding a thermoplastic, and rotating the mould in a rotary oven;
   c. (i) allowing the thermoplastic to set and cure, then demoulding the skin with the metal joists within, then forming an aperture in the sandwich panel and filling the sandwich panel with an insulating material; or
      (ii) allowing the thermoplastic to set and cure, then while the skin is still warm, forming an aperture in the sandwich panel and filling the sandwich panel with an insulating material, then rotating the mould containing the skin further within the oven at a lower temperature than the melting temperature of the skin, then demoulding the sandwich panel; and optionally wherein the insulating material in step c (ii) is a foam-forming powder comprising polyethylene;
   wherein the sandwich panel comprises:
      an inner core comprising the insulating material; and
      the skin, wherein the skin comprises the thermoplastic which completely encloses the inner core;
      a first region which provides part of a roof structure of a building,
      a second region which provides part of a wall structure of the building, and
      a third region which provides part of a floor structure of the building,
      the metal joists, wherein the metal joists are within the skin of the first region and the third region.

2. The method according to claim 1, wherein at least one of the metal joists comprises a hole through which a stand-off plug or spacer element can be secured using a washer and a fastener, the hole being larger than the thread of the stand-off plug or the fastener, and the washer being between the fastener and the at least one metal joist and having an eccentric hole.

3. The method according to claim 1, wherein the first and third regions are substantially planar and the second region is curved in substantially a semicircle, such that the building module is generally U-shaped.

4. The method according to claim 1, wherein the metal joists in the third region are joined to one another by a cross member fixed between the metal joists in the third region, optionally the metal joists in the first region are joined to one another by a cross member fixed between the metal joists in the first region; wherein each cross member is optionally a 100 mm steel tophat joist rivet fixed to the metal joists of the respective first or third region at 600 mm centres.

5. A method for constructing a building module which is a sandwich panel, the method comprising:
   a. forming a skin of the sandwich panel from a thermoplastic in a rotary oven and allowing the thermoplastic to set and cure;
   b. once the skin is set and/cured, demoulding the skin and cutting off at least one end of the sandwich panel to form a cut at an end of the sandwich panel and a cut-off;
   c. inserting metal joists into the sandwich panel; and
   d. filling the sandwich panel with a foamed material and allowing the foamed material to harden; or filling the sandwich panel with a substrate inoculated with mycelium, and drying or heating the mycelium after a growth period to form a mycelium composite material;
   e. once the foamed material is hardened or the mycelium composite material formed, cutting the excess foamed material or the mycelium composite material flush with the cut at the end of the sandwich panel;
   wherein the sandwich panel comprises:
      an inner core comprising the foamed material or the mycelium composite material; and
      the skin, wherein the skin comprises the thermoplastic which completely encloses the inner core;
      a first region which provides part of a roof structure of a building,
      a second region which provides part of a wall structure of the building, and
      a third region which provides part of a floor structure of the building,
      the metal joists, wherein the metal joists are within the skin of the first region and the third region.

6. The method according to claim 5, wherein the first and third regions are substantially planar and the second region is curved in substantially a semicircle, such that the building module is generally U-shaped.

7. The method according to claim 6, wherein in step d) the U-shaped building module is stood vertically and the foamed material is poured into the cut at the end of the sandwich panel in a controlled manner to fill the entire skin of the sandwich panel without gaps.

8. The method according to claim 5, wherein after step e) the sandwich panel is capped by using a custom heating plate to melt the at least one end of the sandwich panel and affixing a thermoplastic end plate, wherein the thermoplastic end plate is optionally the cut-off.

9. The method according to claim 5, wherein the foamed material is a polyethylene foam.

10. The method according to claim 5, wherein the metal joists in the third region are joined to one another by a cross member fixed between the metal joists in the third region, optionally the metal joists in the first region are joined to one another by a cross member fixed between the metal joists in the first region; wherein each cross member is optionally a 100 mm steel tophat joist rivet fixed to the metal joists of the respective first or third region at 600 mm centres.

11. A method for constructing a building module which is a sandwich panel, the method comprising:
   a. extruding a skin of the sandwich panel from a thermoplastic in an extrusion die;
   b. optionally, heating the extrusion and bending the extrusion around a form;
   c. allowing the thermoplastic to set and cure;
   d. once the skin is set and cured, demoulding the skin and cutting off at least one end of the sandwich panel to form a cut at the end of the sandwich panel and a cut-off;
   e. inserting metal joists into the sandwich panel;
   f. filling the sandwich panel with a foamed material and allowing the foamed material to harden; or filling the sandwich panel with a substrate inoculated with mycelium, and drying or heating the mycelium after a growth period to form a mycelium composite material;
   g. once the foamed material is hardened or the mycelium composite material formed, cutting the excess foamed material or mycelium composite material flush with the cut panel;
   wherein the sandwich panel comprises:
      an inner core comprising the foamed material or the mycelium composite material; and
      the skin, wherein the skin comprises the thermoplastic which completely encloses the inner core;
      a first region which provides part of a roof structure of a building,
      a second region which provides part of a wall structure of the building, and
      a third region which provides part of a floor structure of the building,
      the metal joists, wherein the metal joists are within the skin of the first region and the third region.

12. The method according to claim 11, wherein the first and third regions which are substantially planar and the second region is curved in substantially a semicircle, such that the building module is generally U-shaped.

13. The method according to claim 12, wherein in step f) the U-shaped building module is stood vertically and the foamed material is poured into the cut at the end of the sandwich panel in a controlled manner to fill the entire skin of the sandwich panel without gaps.

14. The method according to claim 11, wherein after step (g) the sandwich panel is capped with a thermoplastic end plate using a heat welding process.

15. The method according to claim 11, wherein the metal joists in the third region are joined to one another by a cross member fixed between the metal joists in the third region, optionally the metal joists in the first region are joined to one another by a cross member fixed between the metal joists in the first region; wherein each cross member is optionally a 100 mm steel tophat joist rivet fixed to the metal joists of the respective first or third region at 600 mm centres.

16. The method according to claim 11, wherein the foamed material is a polyethylene foam.

17. A method for constructing a building module which is a sandwich panel, the method comprising:
   a. forming a skin of the sandwich panel from a thermoplastic in a rotary oven and allowing the thermoplastic to set and cure;
   b. once the skin is set and/cured, demoulding the skin and removing at least one end of the sandwich panel;
   c. inserting metal joists into the sandwich panel, and inserting a foam-forming powder into the sandwich panel; wherein the foam-forming powder optionally comprises polyethylene;
   d. returning the sandwich panel and the at least one end of the sandwich panel to the mould; closing the mould and rotating the mould in the oven at a lower heat, to thermally bond the at least one end of the sandwich panel back onto the sandwich panel, as well as expand the foam-forming powder to a foam inside the skin;
   wherein the sandwich panel comprises:
      an inner core comprising the foamed material or the mycelium composite material; and
      the skin, wherein the skin comprises the thermoplastic which completely encloses the inner core;
      a first region which provides part of a roof structure of a building,
      a second region which provides part of a wall structure of the building, and
      a third region which provides part of a floor structure of the building,
      the metal joists, wherein the metal joists are within the skin of the first region and the third region.

18. The method according to claim 17, wherein the first and third regions are substantially planar and the second region is curved in substantially a semicircle, such that the building module is generally U-shaped.

19. The method according to claim 17, wherein the metal joists in the third region are joined to one another by a cross member fixed between the metal joists in the third region, optionally the metal joists in the first region are joined to one another by a cross member fixed between the metal joists in the first region; wherein each cross member is optionally a 100 mm steel tophat joist rivet fixed to the metal joists of the respective first or third region at 600 mm centres.

* * * * *